UNITED STATES PATENT OFFICE.

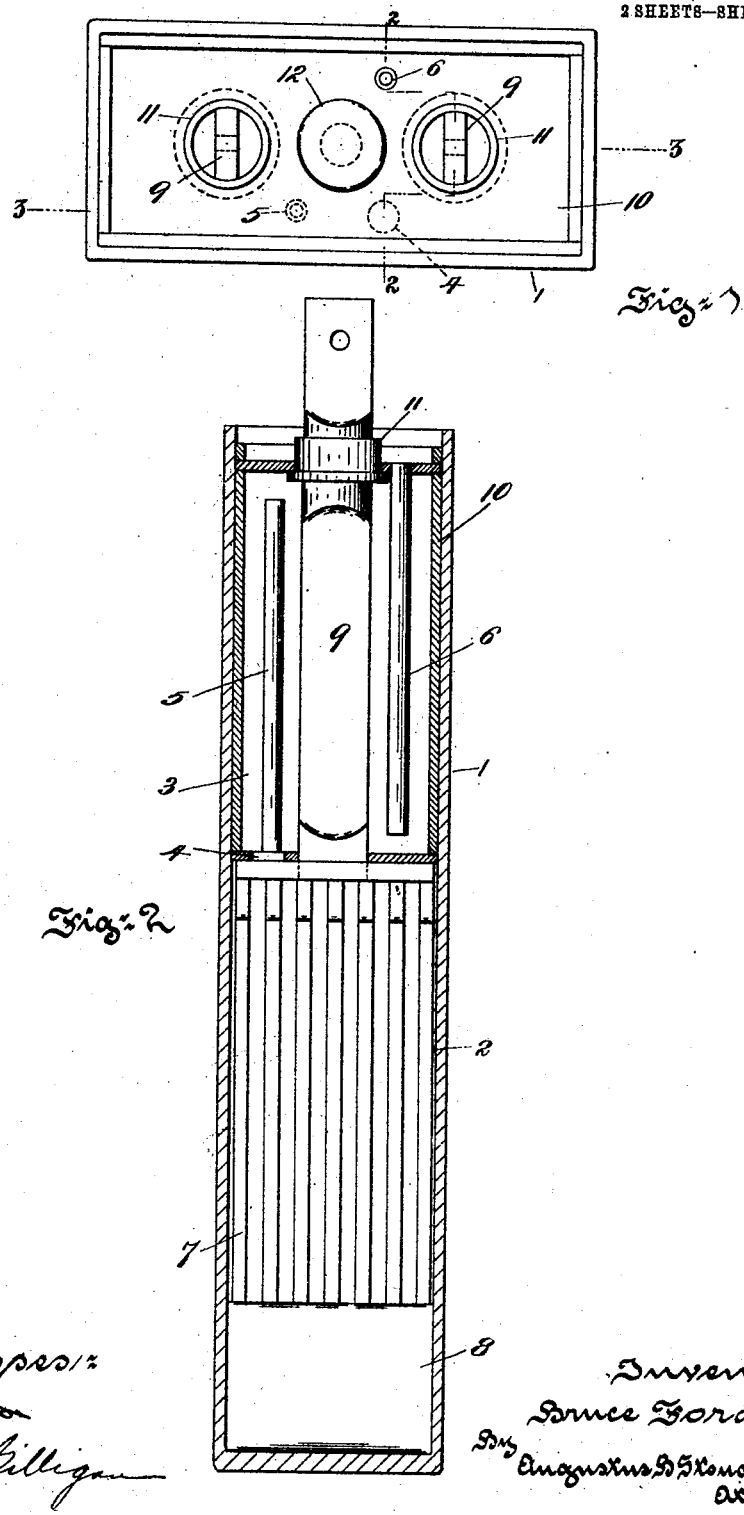

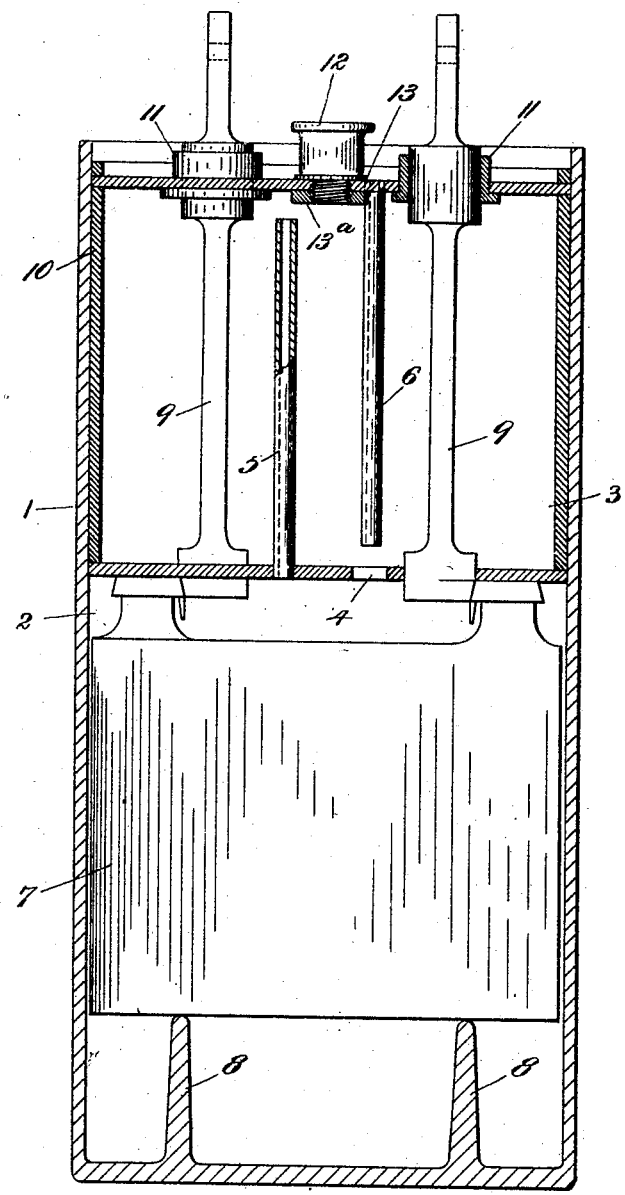

BRUCE FORD, OF PHILADELPHIA, PENNSYLVANIA.

ELECTRIC STORAGE BATTERY.

No. 930,065.   Specification of Letters Patent.   Patented Aug. 3, 1909.

Application filed September 7, 1906. Serial No. 333,589.

*To all whom it may concern:*

Be it known that I, BRUCE FORD, a citizen of the United States, residing at Philadelphia, in the county of Philadelphia and State of Pennsylvania, have invented certain new and useful Improvements in Electric Storage Batteries, of which the following is a specification.

The principal object of the present invention is to provide a battery cell or jar capable of being inverted without spilling its fluid contents and adapted to permit of the escape from its interior of gases and vapors.

Another object of the invention is to provide a simple, light and comparatively inexpensive type of storage battery especially adapted to uses in which it is subjected to rough transportation and usage.

To these and other ends hereinafter set forth the invention comprises the improvements to be presently described and finally claimed.

The nature, characteristic features and scope of my invention will be more fully understood from the following description taken in connection with the accompanying drawings forming part hereof, and in which—

Figure 1, is a top or plan view of a storage battery embodying features of the invention. Fig. 2, is a sectional view taken on the line 2—2 of Fig. 1, and Fig. 3, is a sectional view taken on the line 3—3 of Fig. 1.

In the drawings the battery jar 1, is subdivided into a plate compartment 2, and an overflow compartment 3, having communication with each other by way of an opening 4, and each being closed except as will be hereinafter described.

5, and 6, are tubes each communicating with the compartment 3, and oppositely arranged therein and whereof one 5, communicates with the compartment 2, and the other 6, with the outside of the jar.

7, are plates arranged in the plate compartment and shown as supported upon projections 8, extending upward from the bottom of the jar. These plates are provided with lugs or terminals 9, which extend through the floor and roof or cover of the compartment 3, so as to be accessible for making the proper connections.

The overflow compartment is shown to comprise a separate receptacle 10, provided with side, bottom, top and end walls and complete in itself, so that it can be applied within the battery jar proper. This separate receptacle may be appropriately made of celluloid and provided with proper bushings as of soft rubber 11, for securing a tight joint at the lugs or terminals 9.

12, indicates a detachable plug arranged in the top wall of the receptacle 3, which may be reinforced as at 13ª, for this purpose.

13, is a soft rubber gasket arranged between the plug and the top wall of the receptacle 3.

The opening 4, and tube 6, are shown as arranged out of alinement. The plates 7, which rest upon the projections 8, are when the jar is inverted supported by the structure which constitutes the overflow compartment and which is secured to the jar.

Liquid may be introduced into the plate compartment 2, by removing the plug 12, so that the liquid may enter the compartment 3, and thence pass by way of the opening 4, into the compartment 2. Vapors and gases arising from the compartment 2, may traverse the tube 5, escape into the compartment 3, and thence travel through the tube 6 and escape into the outer air. While at the same time they may also pass through the hole 4, and reach the tube 6. If the battery jar be turned upside down or inverted, the electrolyte will flow from the plate compartment 2, into the overflow compartment 3, from which, however, it may not escape because its level in the compartment 3, will not be as high as the open end of the tube 6. When the jar is again righted the acid or electrolyte passes through the opening 4 and returns to the compartment 2, while the tube 5 serves as a vent for permitting of the escape of gas, vapor and air from the compartment 2, so that the return of the electrolyte is not impeded or interfered with.

Having thus described the nature and objects of my invention what I claim as new and desire to secure by Letters Patent is:

1. An invertible battery jar subdivided into intercommunicating superposed overflow and plate compartments and provided with oppositely arranged vent tubes communicating with the overflow compartment and respectively with the plate compartment and with the outside of the jar and whereof the latter extends into the overflow compartment beyond the possible level of liquid therein when the jar is inverted, substantially as described.

2. An invertible battery jar provided with a cover in combination with a tube opening through the cover and extending into the jar and there provided with an opening at its end, plates arranged at one end of the jar, and a transverse partition arranged to hold the plates and beyond the inner end of the tube and provided with an opening and adapted to break up the wash as the fluid contents of the jar flow from end to end when the jar is inverted, substantially as described.

3. The combination of a battery jar, a structure comprising top, perforated bottom, and side and end walls and constituting an overflow compartment and adapted for insertion in the upper part of the battery jar, and oppositely disposed tubes penetrating the top and bottom walls of said structure and extending in opposite directions inwardly into the compartment and the tube which penetrates the top wall extending into the overflow compartment beyond the possible level of liquid therein when the jar is inverted, substantially as described.

In testimony whereof I have hereunto signed my name.

BRUCE FORD.

Witnesses:
W. A. BLACHFORD,
D. E. MALOY.